US009942056B2

(12) United States Patent
Lin et al.

(10) Patent No.: US 9,942,056 B2
(45) Date of Patent: Apr. 10, 2018

(54) METHODS AND SYSTEMS FOR AUTOMATICALLY MONITORING USER ACTIVITY

(71) Applicant: Vivint, Inc., Provo, UT (US)

(72) Inventors: Rongbin Lanny Lin, Orem, UT (US); Brandon Bunker, Highland, UT (US); Aaron Davis, Pleasant Grove, UT (US); Shiwei Liu, Draper, UT (US)

(73) Assignee: Vivint, Inc., Provo, UT (US)

( * ) Notice: Subject to any disclaimer, the term of this patent is extended or adjusted under 35 U.S.C. 154(b) by 0 days.

(21) Appl. No.: 14/626,774

(22) Filed: Feb. 19, 2015

(65) Prior Publication Data
US 2016/0248598 A1    Aug. 25, 2016

(51) Int. Cl.
*H04L 12/28* (2006.01)
*G08B 21/02* (2006.01)

(52) U.S. Cl.
CPC ...... *H04L 12/2803* (2013.01); *G08B 21/0294* (2013.01); *H04L 12/282* (2013.01); *H04L 12/2816* (2013.01); *H04L 12/2823* (2013.01); *G08B 21/0205* (2013.01); *G08B 21/0291* (2013.01)

(58) Field of Classification Search
USPC ..................................... 340/517, 521, 573.1
See application file for complete search history.

(56) References Cited

U.S. PATENT DOCUMENTS

| 7,551,071 B2 | 6/2009 | Bennett, III et al. |
| 7,589,637 B2 | 9/2009 | Bischoff et al. |
| 9,007,189 B1* | 4/2015 | Curtis .................. A63F 13/798 340/323 R |
| 2004/0019603 A1* | 1/2004 | Haigh ................. G06Q 10/109 |
| 2004/0030531 A1 | 2/2004 | Miller et al. |
| 2005/0234310 A1 | 10/2005 | Alwan et al. |
| 2005/0278409 A1 | 12/2005 | Kutzik et al. |
| 2011/0181422 A1* | 7/2011 | Tran .................... G06F 19/3418 340/573.1 |
| 2012/0229634 A1 | 9/2012 | Laett et al. |
| 2013/0073303 A1 | 3/2013 | Hsu |
| 2013/0204408 A1 | 8/2013 | Thiruvengada et al. |

(Continued)

FOREIGN PATENT DOCUMENTS

EP    2290908 A1    3/2011

OTHER PUBLICATIONS

Lee et al., Smart Homes, Families, and Control, Carnegie Mellon University, Human-Computer Interaction Institute, School of Computer Science, 2006.

(Continued)

*Primary Examiner* — Leon-Viet Nguyen

(74) *Attorney, Agent, or Firm* — Holland & Hart LLP

(57) ABSTRACT

A method for home automation system is described. In one embodiment, the method may include receiving input regarding a list of predetermined activities. The method may further include receiving monitored activity data of at least one authorized user. The method may further include comparing the received monitored activity data with the received input regarding the list of predetermined activities, and operating at least one aspect of the home automation system based, at least in part, on the comparing.

20 Claims, 6 Drawing Sheets

(56) References Cited

U.S. PATENT DOCUMENTS

2014/0006322 A1\* 1/2014 Cragun .................... G06N 5/04
706/14
2015/0243175 A1\* 8/2015 Raman ..................... G09B 5/00
434/236

OTHER PUBLICATIONS

PCT International Search Report for International Application No. PCT/US2016/014900, dated Jun. 17, 2016.

\* cited by examiner

METHODS AND SYSTEMS FOR AUTOMATICALLY MONITORING USER ACTIVITY

BACKGROUND

The present disclosure, for example, relates to a home automation system, and more particularly to operating at least one aspect of the home automation system based, at least in part, on comparing received activity data with a received input regarding a list of predetermined activities.

Home automation systems are widely deployed to provide various types of communication and functional features such as monitoring, communication, notification, and/or others. These systems may be capable of supporting communication with a user through a communication connection or a system management action.

Many parents are concerned with how their children spend time, particularly when the parents are not around. A balance of homework, reading, practicing instruments, playing, watching television, doing chores, and the like is desirable, yet parents have difficulty regulating these activities when they are away from the home. Existing monitoring systems may allow for activity tracking via wearable devices, but such systems include a fatal flaw in that, should the child remove the wearable device while the parent is away, the child's activities will no longer be monitored. Furthermore, wearable devices limit activity tracking to only particular activities.

SUMMARY

Given parents' interest in monitoring their children's activities, it may be desirable to provide a system by which the existing monitoring devices of a home automation system may monitor children's activities in and around the home, and report these activities to the parents. Furthermore, it may be desirable to provide a method by which the home automation system may report these monitored activities to the children themselves, so that the children may be motivated to reach goals and earn privileges accordingly. Further still, it may be desirable to provide a method by which the system may regulate these activities based on parents' preferences, without the need for parental intervention. It may also be desirable to provide a gamification of the monitoring process, such that children are motivated to meet goals of, for example, practicing piano or reading, and to stay within limits on other activities like watching television or playing videogames. This gamification may take the form of rewards given by the parents, or may include recognition or rewards given to children by the home automation system directly. Further, it may be desirable to provide monitoring methods using existing home automation systems, such that all activities occurring in or around the house may be monitored on a continuous basis.

Accordingly, in one embodiment, a method for a home automation system is provided. In one embodiment, the method may comprise receiving input regarding a list of predetermined activities. The method may further comprise receiving monitored activity data of at least one authorized user. The method may comprise comparing the received monitored activity data with the received input regarding the list of predetermined activities, and operating at least one aspect of the home automation system based, at least in part, on the comparing.

One aspect of the present invention relates to providing systems and methods by which parents may track their children's activities in the home on, for example, a weekly or monthly basis. Through a variety of monitors already present in the home as part of a home automation system, including video, audio, and motion sensors, the system may monitor children's activities throughout the week, and may present a summary of the activities to the parents at the end of the week. For example, a report may include the number of hours spent practicing the piano, where the piano practice may be detected based on audio or video sensors, or motion sensors associated with the location of the piano. In addition the report may include the number of hours spent watching television, which may again be detected based on sensors, or through a link with the television or cable system. Further, the report may include the number of hours spent reading or studying, which may be detected using motion sensors or links with iPads, applications on smartphones or computers, or Wi-Fi, and the like.

The monitoring system may also include a gamification aspect, in order to motivate children to meet goals set by their parents, and to stay within limits for certain activities. The parent may preselect goals or thresholds, such that the summary report may indicate, both to the child and to the parent, which goals were met and/or which thresholds were surpassed. For example, a parent may want the child to practice piano for four hours during the week, or may want the child to practice piano three days in a row, and may want the child to watch no more than 90 minutes of television each day during the week. In some embodiments, parents may indicate that certain goals must be met within a predetermined time period, for example, that the child must read for three hours, or must complete 100 pages of reading, within a week. If the child meets these goals or stays within these limits, the parent may be notified that the child has earned some sort of reward of the parent's choosing, like a trip to the zoo, or the child may be rewarded directly by the system. For example, the home automation system may project a badge on the wall or the television screen, or may print a badge or certificate at a connected printer, congratulating the child for achieving a goal. Alternatively or in addition, the system may provide rewards to the child, for example in the form of digital currency or points, which may be redeemed for gifts or prizes, or which may be used to "unlock" additional privileges, like added television or videogame time.

In order to track and meet his activity goals, the child may be able to inquire after his progress at the home automation system. For example, the child may be able to "ask" a control panel how many hours he has read so far this week, and how much more time is needed to reach his goal. Or the child may ask the system how much time he has remaining on his television watching allotment. The system may also provide motivators to children to perform certain activities in order to unlock rewards. For example, the system may notify the child, for example on a television or tablet screen, or at the control panel, that if he practices piano for an hour, he can watch another half hour of television when he is done. In this way, the system may closely monitor and regulate the child's activities based on parental preferences, without the need for further input from the parent.

The system may be operable to detect any number of activities via existing home automation system sensors. For example, using any of motion, audio, visual, vibration, heart rate, respiration, or heat sensors, or a combination thereof, the system may detect activities ranging from instrument practice or reading, to television watching or videogame playing, to performing chores around the house, to exercising, like jumping on a trampoline. In some embodiments, the system may monitor children's activities via wearable monitors, such that physical activities may be monitored even when the child is beyond the range of the home automation system sensors, for example when riding his bicycle in the neighborhood.

In order to monitor various activities, a parent may input activity information for a list of predetermined activities at a home automation system. For example, the parent may wish to label an activity as "piano practice." This parental labeling may occur at the control panel or on a dedicated application on a smartphone or personal computer, and may be received by any of a verbal command received via a microphone, or input at a keypad or other interactive screen, or a combination thereof. In some embodiments, the home automation system may use facial recognition technology to identify the child practicing the piano. The parent may then "teach" the system to identify future piano practice sessions by labeling prerecorded or currently recording piano practice sessions, such that the system may identify future piano practice sessions based on similarly identified features, including any one of the child's location in the house (at the piano), audio recordings (indicating that a piano is being played), time of day or week (set practice schedules), or a combination thereof. This labeling input may occur at a smart home panel, or on a local computing device such as a personal computer, or at a dedicated application on a smartphone.

In other embodiments, the smart home system may "learn" particular activities using artificial intelligence algorithms. For example, the smart home system may combine various sensor readings, such as video, motion, light, location, audio, etc., and create corresponding activity profiles. The system may then detect the activity profile during future sessions, and may further identify the participant through computer vision algorithms and facial recognition technology, such that the activity for the particular child may be tracked. In some embodiments, a particular area of the home may be designated by the parent as a "reading" or "studying" area, such that the system may label any activities occurring in that area accordingly.

With more activities, both recreational and educational, becoming automated, a home automation system may require access to a smartphone, tablet, or personal computer in order to determine whether a child is reading or doing homework, or if he is instead watching YouTube™ videos or playing a videogame. Thus, in some embodiments the home automation system may communicate with a dedicated application on the smartphone, tablet, or personal computer in order to monitor the activities being performed on the device. Additionally, the home automation system may be operable to access and control the operability of particular applications on a device, or the operability of the device as a whole, such that certain activities may be terminated after a predetermined time limit. For example, after it has been determined that a child has played a videogame on his tablet for 45 minutes, the home automation system may quit and lock the videogame application on the tablet, may disable the Wi-Fi connection, or may power down the tablet altogether. In some embodiments, the child may be given, for example, a five minute warning before this action is taken. In other embodiments, the parent may be notified, for example via SMS message, that the child is approaching his time limit on a particular activity, and the parent may choose whether to shut down the activity on the electronic device, or whether to extend the threshold time.

A parent may set goals and thresholds for particular activities, such as reading or watching television, and may additionally set priorities for various activities. For example, the parent may input settings at the home automation system to award different numbers of "points" for various activities based on their priority level, such that children may earn rewards or recognition based on earning a predetermined number of points. Thus, a parent may indicate that playing piano is a top priority, such that five points may be awarded for every hour of practice, and that folding laundry is worth three points, such that if a child performs either or both of these activities and reaches ten points, he may earn an extra hour of videogame time, or some other reward.

The home automation system may also be operable to monitor the quality, in addition to the quantity, of particular activities. For example, by comparing the audio of a monitored piano practicing session to professional recordings of the same tune, obtained, for example, from the Internet via a Wi-Fi connection in the home automation system, the system may be able to identify the quality of the child's practice, and identify improvements thereof, as the child's playing more closely conforms to the recording. Additionally, the home automation system may monitor a child's reading progress, for example via a link with an application on a tablet device, such that the system may monitor the speed with which the child reads each page, and any increases thereof.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

The systems and methods described herein relate to providing a means for monitoring activities of authorized users in a home, and comparing the monitored activities to received input regarding a list of predetermined activities. Moreover, the systems and methods described herein relate to operating at least one aspect of a home automation system based, at least in part, on comparing the monitored activities to the received input regarding the list of predetermined activities.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

Figure 1:
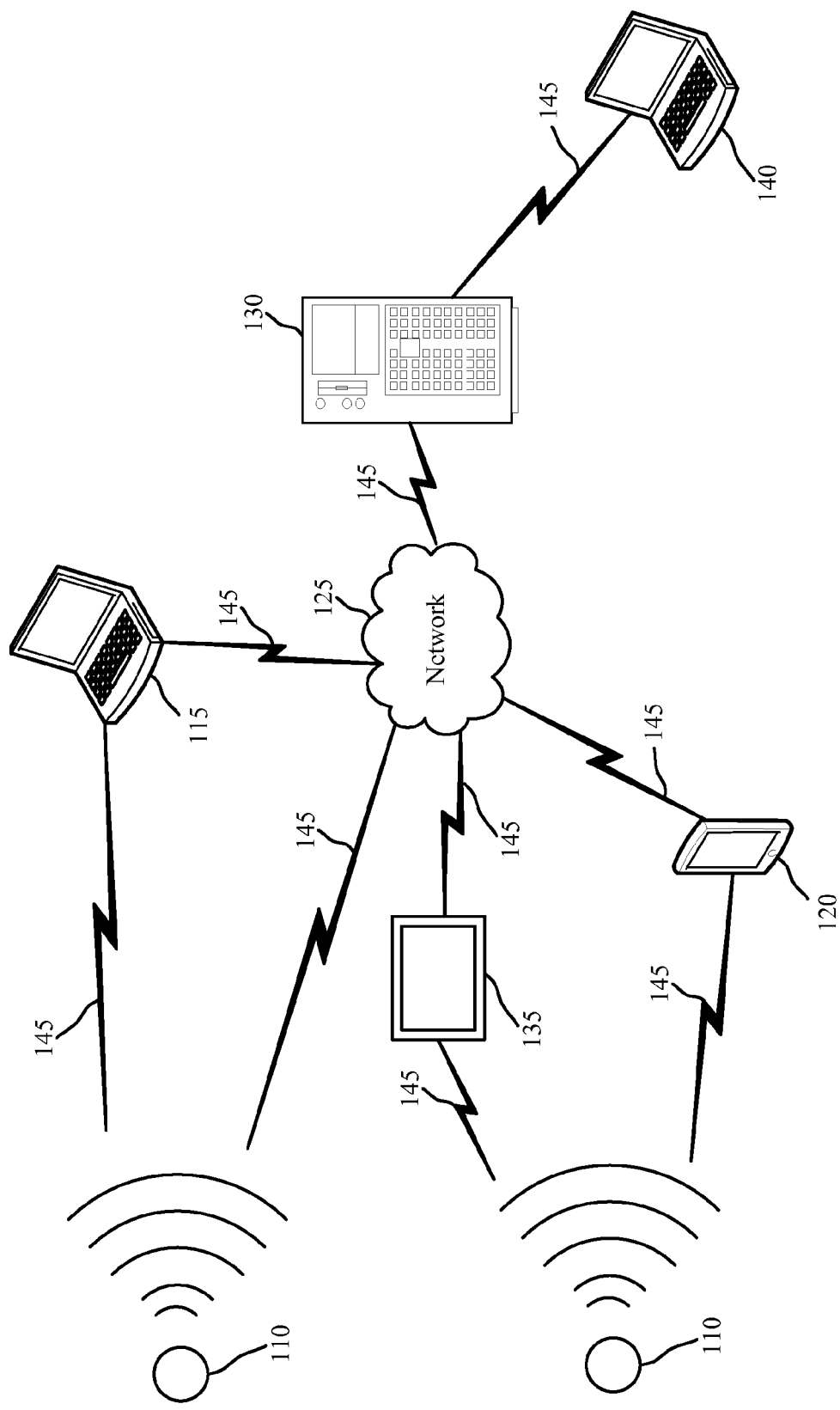
FIG. 1 is a block diagram of an example of a home automation system, in accordance with various embodiments.

FIG. 1 is an example of a home automation system 100 in accordance with various aspects of the disclosure. In some embodiments, the home automation system 100 may include one or more sensor units 110, a local computing device 115, 120, a network 125, a server 130, a control panel 135, and a remote computing device 140. The network 125 may provide user authentication, encryption, access authorization, tracking, Internet Protocol (IP) connectivity, and other access, calculation, modification, and/or functions. The control panel 135 may interface with the network 125 through wired and/or wireless communication links 145 and may perform communication configuration, adjustment, and/or scheduling for communication with local computing device 115, 120 or remote computing device 140, or may operate under the control of a controller. Control panel 135 may communicate with a backend server 130—directly and/or indirectly—using one or more communication links 145.

The control panel 135 may wirelessly communicate via communication links 145 with the local computing device 115, 120 via one or more antennas. The control panel 135 may provide communication coverage for a geographic coverage area. In some examples, control panel 135 may be referred to as a control device, a base transceiver station, a radio base station, an access point, a radio transceiver, a home automation control panel, a smart home panel, or some other suitable terminology. The geographic coverage area for control panel 135 may be divided into sectors making up only a portion of the coverage area. The home automation system 100 may include one or more control panels 135 of different types. The control panel 135 may be related to one or more discrete structures (e.g., a home, a business) and each of the one more discrete structures may be related to one or more discrete areas. Control panel 135 may be a home automation system control panel, for example an interactive panel mounted on a wall in a user's home. Control panel 135 may be in direct communication via wired or wireless communication links 145 with the one or more sensor units 110, or may receive sensor data from the one or more sensor units 110 via local computing devices 115, 120 and network 125, or may receive data via remote computing device 140, server 130, and network 125.

In any embodiment, control panel 135 may comprise a comparing module, described in more detail below with respect to FIGS. 2-3. The control panel 135 may be operable to receive input regarding a list of predetermined activities, and to receive monitored activity data of at least one authorized user from the one or more sensor units 110. The control panel 135 may further be operable to compare the received monitored activity data with the received input regarding the list of predetermined activities, and operate at least one aspect of the home automation system 100 based, at least in part, on the comparing.

The local computing devices 115, 120 may be dispersed throughout the home automation system 100 and each device 115, 120 may be stationary and/or mobile. Local computing devices 115, 120 and remote computing device 140 may be custom computing entities configured to interact with one or more sensor units 110 via network 125, and in some embodiments, via server 130. In other embodiments, local computing devices 115, 120 and remote computing device 140 may be general purpose computing entities. A computing device 115, 120 or 140 may include a cellular phone, a personal digital assistant (PDA), a wireless modem, a wireless communication device, a handheld device, a tablet computer, a laptop computer, a cordless phone, a wireless local loop (WLL) station, a display device (e.g., TVs, computer monitors, etc.), a printer, a sensor, and/or the like. A computing device 115, 120 or 140 may also include or be referred to by those skilled in the art as a user device, a sensor, a smartphone, an iPod®, an iPad®, a Bluetooth device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology. A local computing device 115, 120 and/or control panel 135 may include and/or be one or more sensors that sense: proximity, motion, temperatures, vibration, humidity, sound level or auditory input, smoke, structural features (e.g., glass breaking, window position, door position), time, geo-location data of a user and/or a device, distance, biometrics, weight, speed, height, size, preferences, light, darkness, weather, time, system performance, and/or other inputs that relate to a home automation system. A local computing device 115, 120 may be able to communicate through one or more wired and/or wireless communication links 145 with various components such as control panels, base stations, and/or network equipment (e.g., servers, wireless communication points, etc.) and/or the like.

The communication links 145 shown in home automation system 100 may include uplink (UL) transmissions from a local computing device 115, 120 to a control panel 135, and/or downlink (DL) transmissions from a control panel 135 to a local computing device 115, 120. The downlink transmissions may also be called forward link transmissions while the uplink transmissions may also be called reverse link transmissions. Each communication link 145 may include one or more carriers, where each carrier may be a signal made up of multiple sub-carriers (e.g., waveform signals of different frequencies) modulated according to the various radio technologies. Each modulated signal may be sent on a different sub-carrier and may carry control information (e.g., reference signals, control channels, etc.), overhead information, user data, etc. The communication links 145 may transmit bidirectional communications and/or unidirectional communications. Communication links 145 may include one or more connections, including but not limited to, 345 MHz, Wi-Fi, Bluetooth, cellular, Z Wave, 802.11, peer-to-peer, LAN, WLAN, Ethernet, fire wire, fiber optic, and/or other connection types related to home automation systems.

In some embodiments of home automation system 100, control panel 135 and/or local computing devices 115, 120 may include one or more antennas for employing antenna diversity schemes to improve communication quality and reliability between control panel 135 and local computing devices 115, 120. Additionally or alternatively, control panel 135 and/or local computing devices 115, 120 may employ multiple-input, multiple-output (MIMO) techniques that may take advantage of multi-path, mesh-type environments to transmit multiple spatial layers carrying the same or different coded data.

While the local computing devices 115, 120 may communicate with each other through the control panel 135 using communication links 145, each local computing device 115, 120 may also communicate directly with one or more other devices via one or more direct communication links 145. Two or more local computing devices 115, 120 may communicate via a direct communication link 145 when both devices 115, 120 are in the geographic coverage area or when one or neither devices 115, 120 is within the geographic coverage area. Examples of direct communication links 145 may include Wi-Fi Direct, Bluetooth, wired, and/or, and other P2P group connections. The devices 115, 120 in these examples may communicate according to the WLAN radio and baseband protocol including physical and MAC layers from IEEE 802.11, and its various versions including, but not limited to, 802.11b, 802.11g, 802.11a, 802.11n, 802.11ac, 802.11ad, 802.11ah, etc. In other implementations, other peer-to-peer connections and/or ad hoc networks may be implemented within home automation system 100.

In some embodiments, one or more sensor units 110 may communicate via wired or wireless communication links 145 with one or more of the local computing device 115, 120 or network 125. The network 125 may communicate via wired or wireless communication links 145 with the control panel 135 and the remote computing device 140 via server 130. In alternate embodiments, the network 125 may be integrated with any one of the local computing device 115, 120, server 130, or remote computing device 140, such that separate components are not required. Additionally, in alternate embodiments, one or more sensor units 110 may be integrated with control panel 135, and/or control panel 135 may be integrated with local computing device 115, 120, such that separate components are not required.

The local computing devices 115, 120 and/or control panel 135 may include memory, a processor, an output, a data input and a communication module. The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some embodiments, the local computing devices 115, 120 and/or control panel 135 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, receiving and displaying data from one or more sensor units 110.

The processor of the local computing devices 115, 120 and/or control panel 135 may be operable to control operation of the output of the local computing devices 115, 120 and/or control panel 135. The output may be a television, a liquid crystal display (LCD) monitor, a cathode ray tube (CRT) monitor, speaker, tactile output device, and/or the like. In some embodiments, the output may be an integral component of the local computing devices 115, 120. Similarly stated, the output may be directly coupled to the processor. For example, the output may be the integral display of a tablet and/or smartphone. In some embodiments, an output module may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing devices 115, 120 and/or control panel 135 to the output.

The remote computing device 140 may be a computing entity operable to enable a remote user to monitor the output of the one or more sensor units 110, or to receive a status report or message relating to the monitored activity data as compared with the list of predetermined activities. The remote computing device 140 may be functionally and/or structurally similar to the local computing devices 115, 120 and may be operable to receive data streams from and/or send signals to at least one of the sensor units 110 via the network 125. The network 125 may be the Internet, an intranet, a personal area network, a local area network (LAN), a wide area network (WAN), a virtual network, a telecommunications network implemented as a wired network and/or wireless network, etc. The remote computing device 140 may receive and/or send signals over the network 125 via communication links 145 and server 130.

In some embodiments, the one or more sensor units 110 may be sensors configured to conduct periodic or ongoing automatic measurements related to user activity data of at least one authorized user. Each sensor unit 110 may be capable of sensing multiple activity data parameters, or alternatively, separate sensor units 110 may monitor separate activity data parameters. For example, one sensor unit 110 may measure user activity data using a motion sensor, while another sensor unit 110 (or, in some embodiments, the same sensor unit 110) may detect user activity data via heat or heartbeat detection. In some embodiments, one or more sensor units 110 may additionally monitor alternate user activity data parameters, such as using audio monitors, location position sensors, vibration sensors, or the like. In some embodiments, one or more sensor units 110 may monitor user activity data parameters using wireless signal detectors, to detect activities occurring in relation to electronic devices such as televisions or tablets. In alternate embodiments, a user may input activity data directly at the local computing device 115, 120 or at remote computing device 140. For example, a user may input a duration of time spent performing a particular activity, such as practicing piano, or may input completion of a particular activity, such as folding the laundry. In some embodiments, user input relating to activity data may be processed in conjunction with activity data monitored using one or more sensor units 110.

In some embodiments, the one or more sensor units 110 may be separate from the control panel 135, and may be positioned at various locations throughout the home or property. In other embodiments, the one or more sensor units 110 may be integrated or collocated with home automation system components or home appliances or fixtures. For example, a sensor unit 110 may be integrated with a wall outlet or switch. In still other embodiments, the one or more sensor units 110 may be integrated or collocated with the control panel 135 itself.

Data gathered by the one or more sensor units 110 may be communicated to local computing device 115, 120, which may be, in some embodiments, a thermostat or other wall-mounted input/output home automation system display. In other embodiments, local computing device 115, 120 may be a personal computer or smartphone. Where local computing device 115, 120 is a smartphone, the smartphone may have a dedicated application directed to collecting user activity data. The local computing device 115, 120 may process the data received from the one or more sensor units 110 by comparing the received activity data to the received input regarding a list of predetermined activities. The local computing device 115, 120 may then communicate an action instruction to operate at least one aspect of the home automation system. In alternate embodiments, remote computing device 140 may process the data received from the one or more sensor units 110, via network 125 and server 130, to obtain action instructions for the at least one aspect of the home automation system. Data transmission may occur via, for example, frequencies appropriate for a personal area network (such as Bluetooth or IR communications) or local or wide area network frequencies such as radio frequencies specified by the IEEE 802.15.4 standard.

In some embodiments, local computing device 115, 120 may communicate with remote computing device 140 or control panel 135 via network 125 and server 130. Examples of networks 125 include cloud networks, local area networks (LAN), wide area networks (WAN), virtual private networks (VPN), wireless networks (using 802.11, for example), and/or cellular networks (using 3G and/or LTE, for example), etc. In some configurations, the network 125 may include the Internet. In some embodiments, a user may access the functions of local computing device 115, 120 from remote computing device 140. For example, in some embodiments, remote computing device 140 may include a mobile application that interfaces with one or more functions of local computing device 115, 120.

The server 130 may be configured to communicate with the sensor units 110, the local computing devices 115, 120, the remote computing device 140 and control panel 135. The server 130 may perform additional processing on signals received from the one or more sensor units 110 or local computing devices 115, 120, or may simply forward the received information to the remote computing device 140 and control panel 135.

Server 130 may be a computing device operable to receive data streams (e.g., from one or more sensor units 110 and/or local computing device 115, 120 or remote computing device 140), store and/or process data, and/or transmit data and/or data summaries (e.g., to remote computing device 140). For example, server 130 may receive a stream of user activity data based on motion detection from a sensor unit 110, a stream of user activity data based on vibration monitoring from the same or a different sensor unit 110, and a stream of user activity data derived from wireless signals received at either the same or yet another sensor unit 110. In some embodiments, server 130 may "pull" the data streams, e.g., by querying the sensor units 110, the local computing devices 115, 120, and/or the control panel 135. In some embodiments, the data streams may be "pushed" from the sensor units 110 and/or the local computing devices 115, 120 to the server 130. For example, the sensor units 110 and/or the local computing device 115, 120 may be configured to transmit data as it is generated by or entered into that device. In some instances, the sensor units 110 and/or the local computing devices 115, 120 may periodically transmit data (e.g., as a block of data or as one or more data points).

The server 130 may include a database (e.g., in memory) containing user activity data received from the sensor units 110 and/or the local computing devices 115, 120. Additionally, as described in further detail herein, software (e.g., stored in memory) may be executed on a processor of the server 130. Such software (executed on the processor) may be operable to cause the server 130 to monitor, process, summarize, present, and/or send a signal associated with user activity data.

Figure 2:
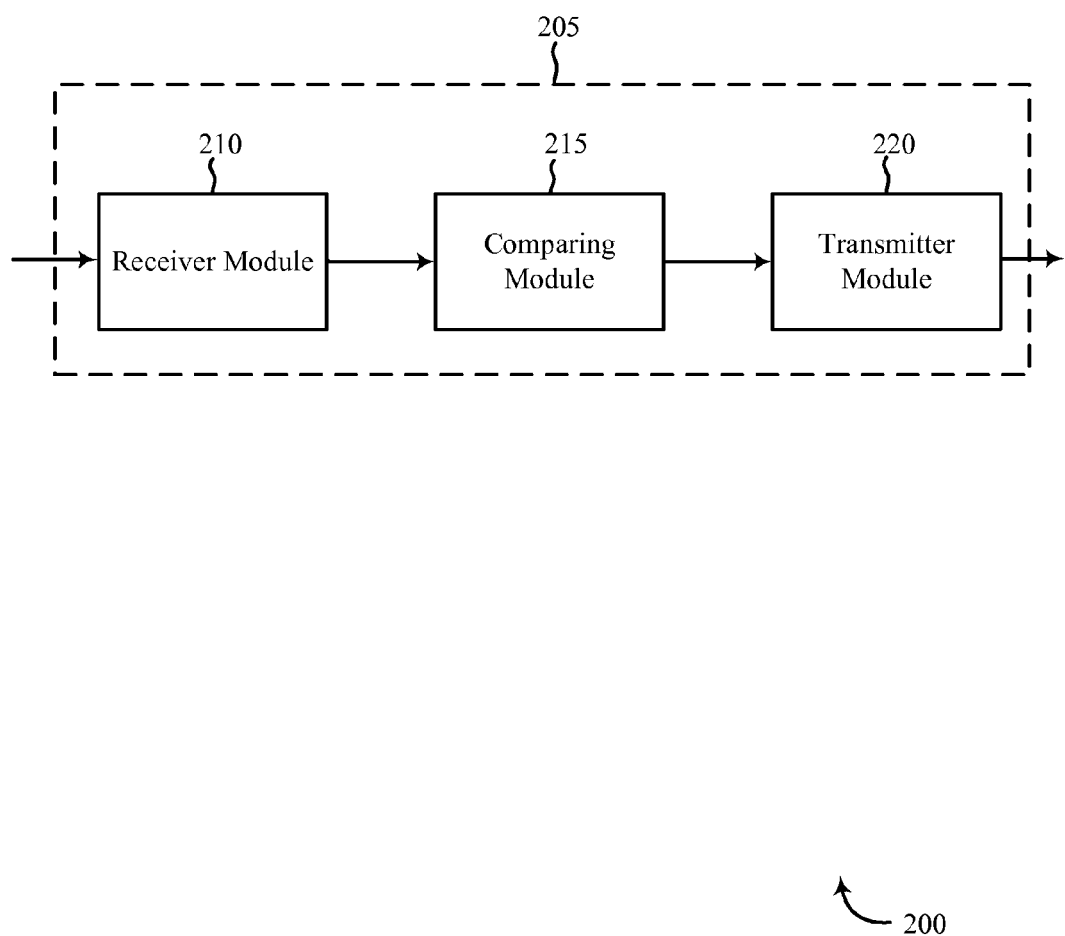
FIG. 2 shows a block diagram of a device relating to a home automation system, in accordance with various aspects of this disclosure.

FIG. 2 shows a block diagram 200 of an apparatus 205 for use in a home automation system, in accordance with various aspects of this disclosure. The apparatus 205 may be an example of one or more aspects of a control panel 135, or in other embodiments may be an example of one or more aspects of the one or more sensor units 110, or in still other embodiments may be an example of one or more aspects of the local computing device 115, 120 or remote computing device 140, each of which are described with reference to FIG. 1. The apparatus 205 may include any of a receiver module 210, a comparing module 215, and/or a transmitter module 220. The apparatus 205 may also be or include a processor. Each of these modules may be in communication with each other—directly and/or indirectly.

The components of the apparatus 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210 may receive information such as packets, user data, and/or control information associated with various information channels (e.g., control channels, data channels, etc.). The receiver module 210 may be configured to receive input regarding a list of predetermined activities. For example, a parent may input at a control panel or in a dedicated application on a smartphone, preferences relating to various activities for their child(ren). The activity preferences may relate to any of the type of activity, the duration of time for which the activity may be performed, the quality of performance of the activity, the identity of the user performing the activity, or a combination thereof. For example, the parent may input a list of activities and corresponding preferences, including practicing the piano for four hours, watching no more than three hours of television, folding the laundry, reading twenty pages in an hour, etc., where each activity corresponds to one or more identified child.

While discussed with regard to parents determining activity guidelines for children, the present disclosure may be applicable to activity monitoring of any user by another user, or activity monitoring for a user's personal use. For example, a user may provide input regarding a list of predetermined activities at his home automation system in order to track the duration of time he spends performing various activities, or to limit himself to particular durations of time for various activities.

As previously discussed, one or more sensor units may monitor activity data of the child or other authorized user. The receiver module 210 may receive the monitored activity data from the one or more sensor units. Receiver module 210 may be operable to identify the type of activity being performed based on the received activity data from the one or more sensor units, as discussed in more detail with respect to FIG. 3. Where apparatus 205 is one or more sensor unit, the monitored activity data may be received at the apparatus 205 and communicated directly to the receiver module 210. In embodiments where apparatus 205 is a control panel, local computing device, or remote computing device, the monitored activity data may be communicated, for example via a wireless communication link, from the one or more sensor unit monitoring the activity to the receiver module 210 at apparatus 205.

The activity data and input regarding a list of predetermined activities received at receiver module 210 may then be communicated to comparing module 215, which may compare the received activity data with the received input regarding the list of predetermined activities. For example, the comparing module 215 may compare the duration of time spent watching television to the parent's inputted preferences as to how long the child is allowed to watch television. In another example, the comparing module 215 may compare the child's rate of reading to the parent's inputted preferences as to the speed at which the child should complete his reading assignment. On the basis of the comparing, the comparing module 215 may derive an action instruction, and may then communicate the action instruction to transmitter module 220.

Transmitter module 220 may communicate the action instruction to the appropriate aspect of the home automation system. For example, the action instruction may indicate that the child has reached his television watching limit, and that the television should be turned off. Accordingly, the transmitter module may communicate that action instruction to the television, for example via a wireless signal, and the television may accordingly shut off. In another example, the action instruction may indicate that the child has practiced piano for a sufficient period of time according to the parent's inputted preferences, and may direct the transmitter module 220 to communicate a message to the child's parents indicating that the piano practice goal has been met. The transmitter module 220 may accordingly communicate this message to the parent, for example via an SMS message to the parent's mobile phone. On the basis of receiving this message, the parents may elect to reward the child by taking him to get ice cream or the like.

Figure 3:
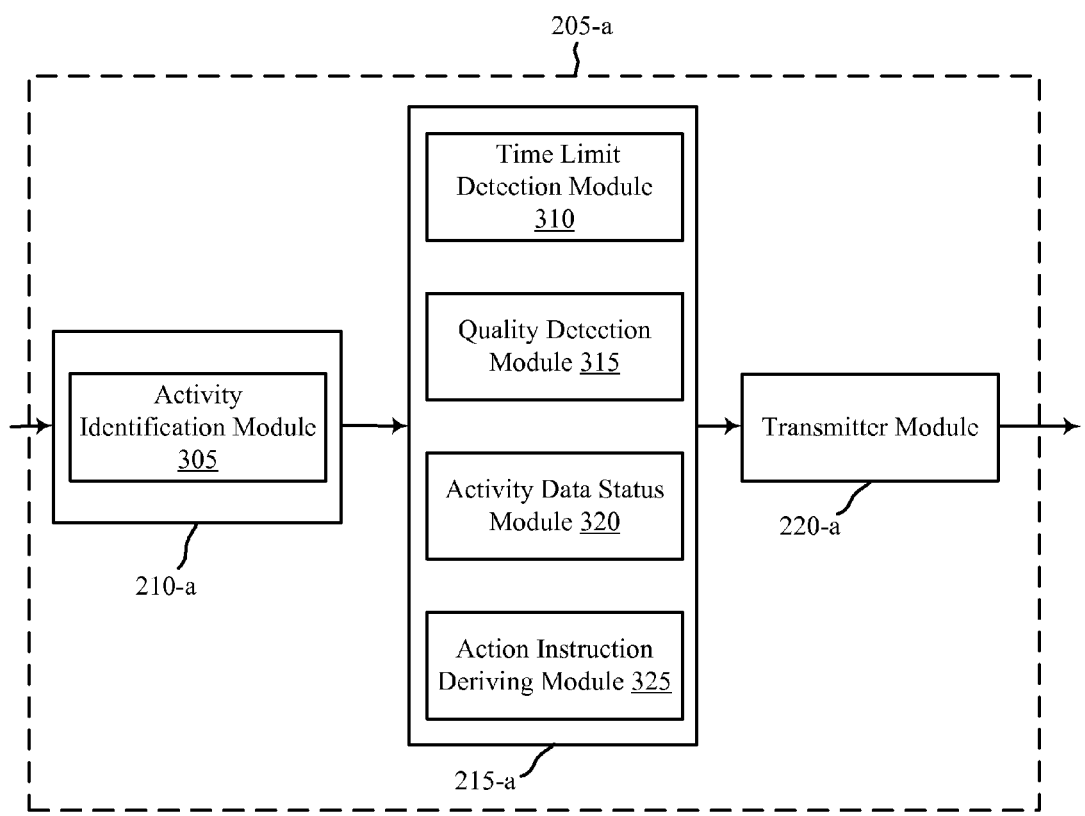
FIG. 3 shows a block diagram of a device relating to a home automation system, in accordance with various aspects of this disclosure.

Apparatus 205-a, which may be an example of apparatus 205 illustrated in FIG. 2, is further detailed in FIG. 3. Apparatus 205-a may comprise any of a receiver module 210-a, a comparing module 215-a, and/or a transmitter module 220-a, each of which may be examples of the receiver module 210, the comparing module 215, and the transmitter module 220 as illustrated in FIG. 2. Apparatus 205-a may comprise, as a component of the receiver module 210-a, an activity identification module 305, and may further comprise, as components of the comparing module 215-a, any of a time limit detection module 310, a quality detection module 315, an activity data status module 320, or an action instruction deriving module 325.

The components of apparatus 205-a may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

As previously discussed, apparatus 205-a may be any of a control panel, a local computing device, or one or more sensor unit. Receiver module 210-a may comprise an activity identification module 305. Activity identification module 305 may be operable to identify the activity being performed by the authorized user on the basis of the monitored activity data received. This identification may occur by comparing the received activity data to activity identity data inputted at the home automation device, or may be derived as a result of the home automation system "learning" to identify the activity based on detected patterns. For example, a parent may input activity identity data at the home automation device as her daughter is practicing piano, such that the home automation device may associate the currently detected audio, visual, vibration, location, user identity, etc. data with piano practice. Alternatively or in addition, the home automation device may "learn" the identities of various activities on the basis of detected patterns. For example, the home automation device may associate received heart rate data and location data with a child jumping on a trampoline. In either embodiment, the activity identification module 305 may use programmed and/or learned activity identity data to associate the received monitored activity data with a particular activity identity.

The received monitored activity data and associated activity identity may then be communicated from the receiver module 210-a to the comparing module 215-a. Depending upon the received input regarding the list of predetermined activities, the comparing module 215-a may then compare the received monitored activity data with the appropriate predetermined activity input. For example, where a parent has inputted a requisite piano practice time threshold, time limit detection module 310 may compare the received monitored activity data associated with piano practice with the inputted practice duration threshold to determine whether the child has met the piano practice time requirement. Where it is determined that the child has met the practice requirement, time limit detection module 310 may communicate that status to the action instruction deriving module 325.

The action instruction deriving module 325 may determine, based on inputted parent preferences, that the child has earned an hour of television based upon having completed the piano practice requirement, and may derive an action instruction to turn on the television, or alternatively or in addition may derive an action instruction to communicate a message to the child indicating that she may watch television. The action instruction may be communicated to the transmitter module 220-a, which may transmit the action instruction to the appropriate aspect of the home automation system. For example, the transmitter module 220-a may communicate the "turn on" action instruction to the television, for example via a wireless signal, and the television may accordingly turn on. Alternatively or in addition, the transmitter module 220-a may communicate the "you may watch television now" message to the child by, for example, displaying the message at a control panel screen, projecting the message onto a wall, displaying the message on the television screen, announcing the message to the child over a speaker, or the like. In other embodiments, the "reward" for having met the piano practice time threshold may comprise earning virtual currency or points, digital badges, positive report cards, or any predetermined parent preference.

In examples in which the time limit detection module 310 determines that the child has not yet met the piano practice or other activity time threshold, the time limit detection module 310 may communicate this status to the action instruction deriving module 325. The action instruction deriving module 325 may accordingly derive an instruction to lock the television to prevent the television from being turned on by the child, or may derive an action instruction to communicate a message to the parent or child that additional piano practice time is required. In either embodiment, the action instruction may be communicated by the transmitter module 220-a to the appropriate home automation system aspect or component.

Where the input regarding the list of predetermined activities relates to activity quality, monitored activity data and derived activity identity data may be communicated from the receiver module 210-a to the quality detection module 315. For example, a parent may have inputted a preference at the home automation system that her child should read at a pace of one page per three minutes, for a total of ten pages in thirty minutes. Upon receiving monitored reading data, then, the quality detection module 315 may compare the monitored reading data with the reading quality threshold to determine whether the child has met the predetermined reading goal. Whether the child has met the threshold or not, that status may be communicated to the action instruction deriving module 325, which may derive an appropriate action instruction based on the received status. For example, where the child has achieved the reading goal, the action instruction deriving module 325 may derive an action instruction to be sent to a printer to print a congratulatory certificate or badge for the child. The action instruction may accordingly be communicated to the printer by the transmitter module 220-a, for example via a wireless connection. In other embodiments, alternate rewards may be given for achieving the goal. Alternatively, where the child has not achieved the reading goal and has read too slowly, the action instruction deriving module 325 may derive an instruction to communicate a message to the parent to notify her that her child is not progressing in his reading. Transmitter module 220-a may accordingly communicate the message to the parent, for example via an SMS message at the parent's mobile phone, and the parent may decide to enroll her child in tutoring, for example.

In some embodiments, a user may input at the home automation device an activity data status request. For example, a child may wish to know how much longer he must study before he is allowed to play videogames, or a parent may wish to view her child's progress in doing the chores assigned to the child. The parent or child may input the request at a control panel of the home automation system, or may input the request at a dedicated application on a local computing device such as a smartphone or personal computer. In some embodiments, the request may be received via one or more sensor units, which may detect audio from the parent or child speaking the request according to a predetermined command or phrase. Upon receiving the request, received monitored activity data may be communicated from the receiver module 210-a to the activity data status module 320. The activity data status module may compile received activity data for a single activity, or for a plurality of activities, depending upon the inputted request from the user. The activity data status module may then compare the activity data for the one or more activities to the corresponding input regarding the predetermined activities, and may determine the child's progress with respect to the inputted activity requirements and thresholds. The compared data may then be communicated to the action instruction deriving module 325, which may derive an activity data status report based on the received compared data, and may communicate the report to the transmitter module 220-a. The derived activity data status report may be displayed at a control panel for example, or may be printed from a printer, or may be delivered to a dedicated application at the requesting user's smartphone or tablet, or the like. In some embodiments, the derived activity data status report may be communicated to the requesting user by announcing the report over a speaker in the home.

Figure 4:
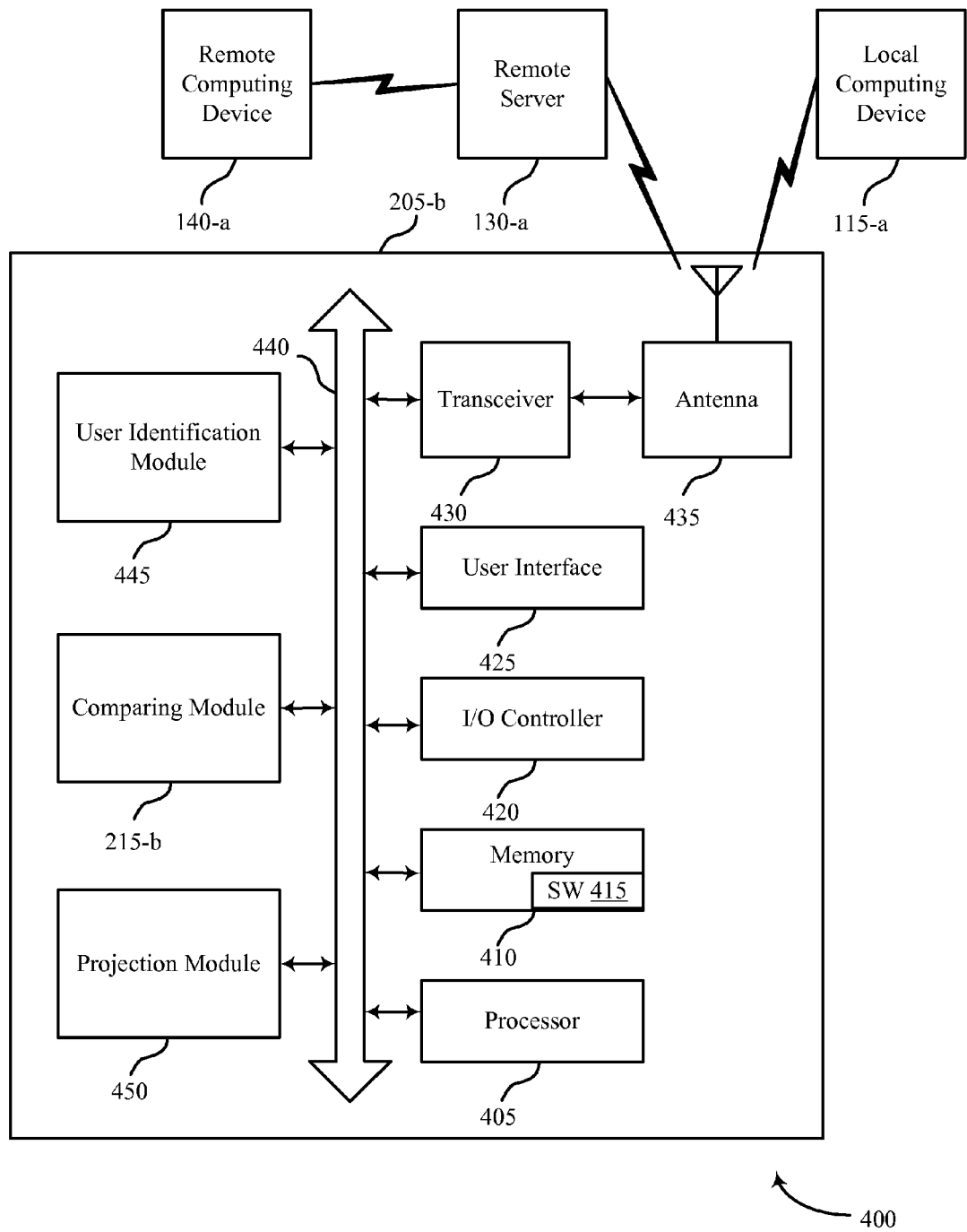
FIG. 4 shows a block diagram relating to a home automation system, in accordance with various aspects of this disclosure.

FIG. 4 shows a system 400 for use in monitoring activity data of at least one authorized user, and comparing activity data with received input regarding a list of predetermined activities, in accordance with various examples. System 400 may include an apparatus 205-b, which may be an example of the control panel 135 of FIG. 1. Apparatus 205-b may also be an example of one or more aspects of apparatus 205 and/or 205-a of FIGS. 2 and 3.

Apparatus 205-b may include a comparing module 215-b, which may be an example of the comparing module 215, 215-a described with reference to FIGS. 2 and 3. Apparatus 205-b may also include components for comparing received monitored activity data with the received input regarding the list of predetermined activities, and for operating at least one aspect of the home automation system based, at least in part, on the comparing. For example, user identification module 445 may be operable to identify the user performing the monitored activity, such that the monitored activity data may be compared with the appropriate corresponding input regarding the list of predetermined activities. In one embodiment, monitored activity data showing a user practicing the piano may be received at the user identification module 445, which may use a variety of known identification methods to identify the user who is practicing the piano. The user identity and activity data may then be communicated to the comparing module 215-b, which may compare the monitored activity data with the received input regarding piano practice thresholds for the particular identified user. For example, the received input may indicate that Molly must practice piano for three hours; the comparing module 215-b may therefore receive the activity data indicating that piano practice has taken place, and identity data from user identification module 445 indicating that Molly was the user practicing, and may determine whether the three hour threshold has been met.

Apparatus 205-b may also include a component for communicating the status of the monitored activity data to the at least one authorized user, where the communication is performed locally at the apparatus 205-*b*, as opposed to being communicated to a remote computing device, as previously discussed with respect to an alternate embodiment. Thus, projection module 450 may be operable to receive monitored activity data for the at least one authorized user, compared with the received input regarding the list of predetermined activities from comparing module 215-*b*, and may derive a status report indicating the status of the user's progress in performing activities as compared with the thresholds for each activity inputted at the home automation system. The status report may then be communicated to the at least one authorized user by the projection module 450, in the form of, for example, a message projected onto a wall, ceiling, floor, or other surface adjacent to the apparatus 205-*b*. Alternatively or in addition, the projection module 450 may communicate an action instruction to, for example, a television or printer to display or print the status report, respectively. The status report may contain information relating to one individual user's progress with respect to a single or multiple activities, multiple users' progress with respect to a single or multiple activities, or a combination thereof.

Apparatus 205-*b* may also include components for bi-directional data communications including components for transmitting communications and components for receiving communications. For example, apparatus 205-*b* may communicate activity data, input regarding a list of predetermined activities, and derived action instructions for at least one aspect of a home automation system bi-directionally with one or more of a local computing device 115-*a*, a remote server 130-*a*, and/or a remote computing device 140-*a*. This bi-directional communication may be direct (e.g., apparatus 205-*b* communicating directly with local computing device 120-*a*) or indirect (e.g., apparatus 205-*b* communicating with remote computing device 140-*a* via remote server 130-*a*). Remote server 130-*a*, remote computing device 140-*a*, and local computing device 115-*a* may be examples of remote server 130, remote computing device 140, and local computing device 115, 120 as shown with respect to FIG. 1.

As previously discussed, the comparing module 215-*b* may receive activity data and input regarding a list of predetermined activities, and may compare the received activity data with the received input regarding the list of predetermined activities. In this way, comparing module 215-*b* may be operable to determine whether activities performed by at least one authorized user have met or exceeded thresholds and goals inputted at the home automation system. For example, the comparing module 215-*b* may receive activity data indicating that a user has played videogames for two hours, and may further receive input indicating that the user is only allowed to play a maximum of three hours of videogames. By comparing the received activity data with the input regarding that activity, the comparing module 215-*b* may determine that the user has not yet reached the activity threshold, and may continue to play videogames for an additional hour. This activity status information may be communicated from the comparing module 215-*b* to the projection module 450, which may communicate this status to the user, for example in the form of a projection on the wall indicating the remaining time for the user to play videogames. In other embodiments, the compared activity data may be communicated from comparing module 215-*b* to, for example, a parent, at a local computing device 115-*a* or a remote computing device 140-*a*.

Apparatus 205-*b* may also include a processor module 405, and memory 410 (including software (SW) 415), an input/output controller module 420, a user interface module 425, a transceiver module 430, and one or more antennas 435, each of which may communicate—directly or indirectly—with one another (e.g., via one or more buses 440). The transceiver module 430 may communicate bi-directionally—via the one or more antennas 435, wired links, and/or wireless links—with one or more networks or remote devices as described above. For example, the transceiver module 430 may communicate bi-directionally with one or more of remote server 130-*a* or local computing device 115-*a*. The transceiver module 430 may include a modem to modulate the packets and provide the modulated packets to the one or more antennas 435 for transmission, and to demodulate packets received from the one or more antennas 435. While an apparatus comprising a control panel (e.g., 205-*b*) may include a single antenna 435, the apparatus may also have multiple antennas 435 capable of concurrently transmitting or receiving multiple wired and/or wireless transmissions. In some embodiments, one element of apparatus 205-*b* (e.g., one or more antennas 435, transceiver module 430, etc.) may provide a direct connection to a remote server 130-*a* via a direct network link to the Internet via a POP (point of presence). In some embodiments, one element of apparatus 205-*b* (e.g., one or more antennas 435, transceiver module 430, etc.) may provide a connection using wireless techniques, including digital cellular telephone connection, Cellular Digital Packet Data (CDPD) connection, digital satellite data connection, and/or another connection.

The signals associated with system 400 may include wireless communication signals such as radio frequency, electromagnetics, local area network (LAN), wide area network (WAN), virtual private network (VPN), wireless network (using 802.11, for example), 345 MHz, Z Wave, cellular network (using 3G and/or LTE, for example), and/or other signals. The one or more antennas 435 and/or transceiver module 430 may include or be related to, but are not limited to, WWAN (GSM, CDMA, and WCDMA), WLAN (including Bluetooth and Wi-Fi), WMAN (WiMAX), antennas for mobile communications, antennas for Wireless Personal Area Network (WPAN) applications (including RFID and UWB). In some embodiments each antenna 435 may receive signals or information specific and/or exclusive to itself. In other embodiments each antenna 435 may receive signals or information neither specific nor exclusive to itself.

In some embodiments, the user interface module 425 may include an audio device, such as an external speaker system, an external display device such as a display screen, and/or an input device (e.g., remote control device interfaced with the user interface module 425 directly and/or through I/O controller module 420).

One or more buses 440 may allow data communication between one or more elements of apparatus 205-*b* (e.g., processor module 405, memory 410, I/O controller module 420, user interface module 425, etc.).

The memory 410 may include random access memory (RAM), read only memory (ROM), flash RAM, and/or other types. The memory 410 may store computer-readable, computer-executable software/firmware code 415 including instructions that, when executed, cause the processor module 405 to perform various functions described in this disclosure (e.g., receive activity data and input regarding a list of predetermined activities, compare the received activity data with the input regarding the list of predetermined activities, operate at least one aspect of the home automation system, etc.). Alternatively, the software/firmware code 415 may not be directly executable by the processor module 405 but may cause a computer (e.g., when compiled and executed) to perform functions described herein.

In some embodiments the processor module 405 may include, among other things, an intelligent hardware device (e.g., a central processing unit (CPU), a microcontroller, and/or an ASIC, etc.). The memory 410 may contain, among other things, the Basic Input-Output system (BIOS) which may control basic hardware and/or software operation such as the interaction with peripheral components or devices. For example, the comparing module 215-b may be stored within the system memory 410. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface (e.g., transceiver module 430, one or more antennas 435, etc.).

Many other devices and/or subsystems may be connected to, or may be included as, one or more elements of system 400 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and is not discussed in detail in this disclosure. Code to implement the present disclosure may be stored in a non-transitory computer-readable medium such as one or more of system memory 410 or other memory. The operating system provided on I/O controller module 420 may be iOS®, ANDROID®, MS-dOS®, MS-WINDOWS®, OS/2®, UNIX®, LINUX®, or another known operating system.

The components of the apparatus 205-b may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

Figure 5:
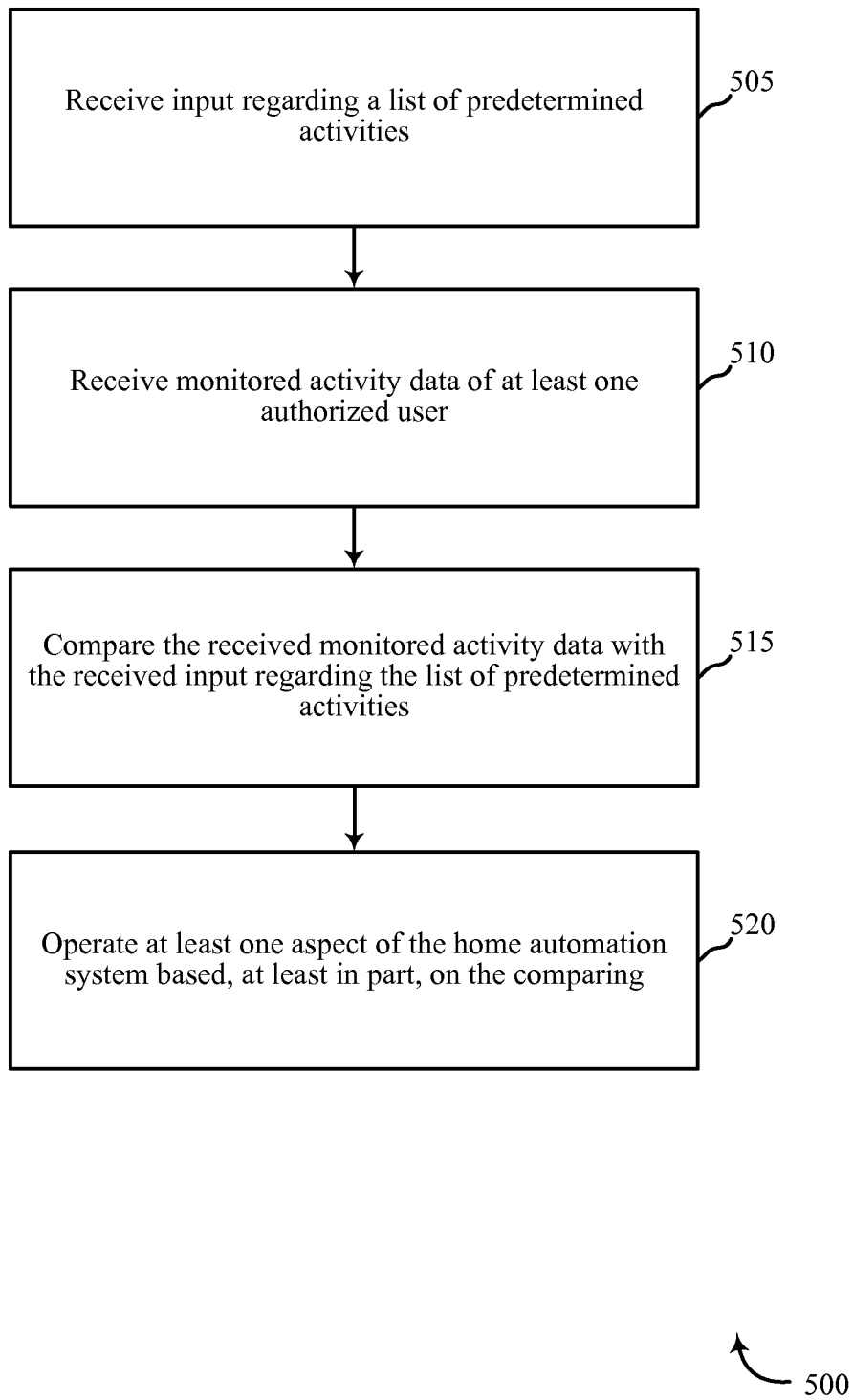
FIG. 5 is a flow chart illustrating an example of a method relating to a home automation system, in accordance with various aspects of this disclosure.

FIG. 5 is a flow chart illustrating an example of a method 500 for a home automation system, in accordance with various embodiments. For clarity, the method 500 is described below with reference to aspects of one or more of the sensor units 110, local computing device 115, 120, control panel 135, and/or remote computing device 140 described with reference to FIGS. 1-4, and/or aspects of one or more of the apparatus 205, 205-a, or 205-b described with reference to FIGS. 2-4. In some examples, a control panel, local computing device, and/or sensor unit may execute one or more sets of codes to control the functional elements described below. Additionally or alternatively, the control panel, local computing device, and/or sensor unit may perform one or more of the functions described below using special-purpose hardware.

At block 505, the method 500 may include receiving input regarding a list of predetermined activities at a home automation device. As previously stated, a user may input preferences regarding a list of predetermined activities to be monitored. For example, a user may input at a control panel, or at a dedicated application on a local or remote computing device, preferences for quality and/or quantity of activities to be performed by one or more authorized user. In one embodiment, a user may input a time duration threshold for which a particular user must do homework, a speed at which the same or a different user must read, measured by pages per minute, a total time for which the same or a third user may watch television, and the like.

At block 510, the method 500 may include receiving monitored activity data of at least one authorized user. Activity data may be monitored by one or more sensor unit, or may be inputted directly at a control panel, local computing device, or remote computing device. For example, one or more sensor unit may detect various user activities by monitoring any of motion, audio, vibration, heat, heartbeat, breathing, location, or the like. In one embodiment, a user may input activity data at, for example, a dedicated application on his smartphone, for example indicating that he has exercised for thirty minutes. In another embodiment, the monitored activity data may be received from a wireless signal associated with an appliance or device in the home. For example, a television, computer, or tablet may send a signal to the home automation system indicating a duration of time or subject matter of a user's viewing or interaction activities with the device. The received monitored activity data may relate to a single user, or may pertain to a plurality of users in the home.

At block 515, the method 500 may include comparing the received monitored activity data with the received input regarding the list of predetermined activities. As previously discussed, the received monitored activity data may comprise any of a user identity, user activity type, quality of user activity, or duration of time spent by the user performing the activity, or a combination thereof. Similarly, the received input regarding the list of predetermined activities may comprise any of user identities relating to the list of predetermined activities, types of user activities, quality of user activities to be performed, or duration of time to be spent performing each of the user activities, or a combination thereof. Accordingly, corresponding activity data from the monitored activity data and received input regarding the list of predetermined activities may be compared at block 515 to determine the status of various users with respect to various activities. For example, the comparing may reveal that a first user has met the threshold for quality of piano practice, has not yet met the time threshold for watching television, and has not yet performed the chore of folding the laundry. In another example, the comparing may reveal that a second user has exercised for a sufficient duration, has exceeded the threshold for duration of time to be spent playing videogames, and has not met the threshold for speed of reading based on pages per minute.

At block 520, the method 500 may include operating at least one aspect of the home automation system based, at least in part, on the comparing. Thus, based on the comparing of received input regarding the list of predetermined activities with the received monitored activity data of the at least one authorized user, the method 500 may comprise deriving an action instruction to be carried out by the home automation system, or to be communicated to a component thereof. For example, where the first user has met the threshold for quality of piano practice, the home automation system may derive and communicate an action instruction to a control panel to project a congratulatory message or badge onto the wall of the living room for the first user and/or his parents to see. In another example, where the first user has not yet performed a required chore, the home automation system may communicate an action instruction to the television to turn off, with an accompanying message displayed on the television screen directing the first user to complete the chore, and notifying the first user that the television may be turned back on once the chore is completed. In yet another example, where the second user has not met the threshold for speed of reading, the home automation system may communicate a message, for example via SMS message, to the parent of the second user notifying him that his child is reading too slowly and should visit a tutor. Any other action instruction associated with an aspect of the home automation system is similarly envisioned.

The operations at blocks 505, 510, 515, and 520 may be performed using the receiver module 210, 210-a, the comparing module 215, 215-a, 215-b, the transmitter module 220, 220-a, and/or the transceiver module 430, described with reference to FIGS. 2-4.

Thus, the method 500 may provide for activity monitoring methods relating to a home automation system. It should be noted that the method 500 is just one implementation and that the operations of the method 500 may be rearranged or otherwise modified such that other implementations are possible.

Figure 6:
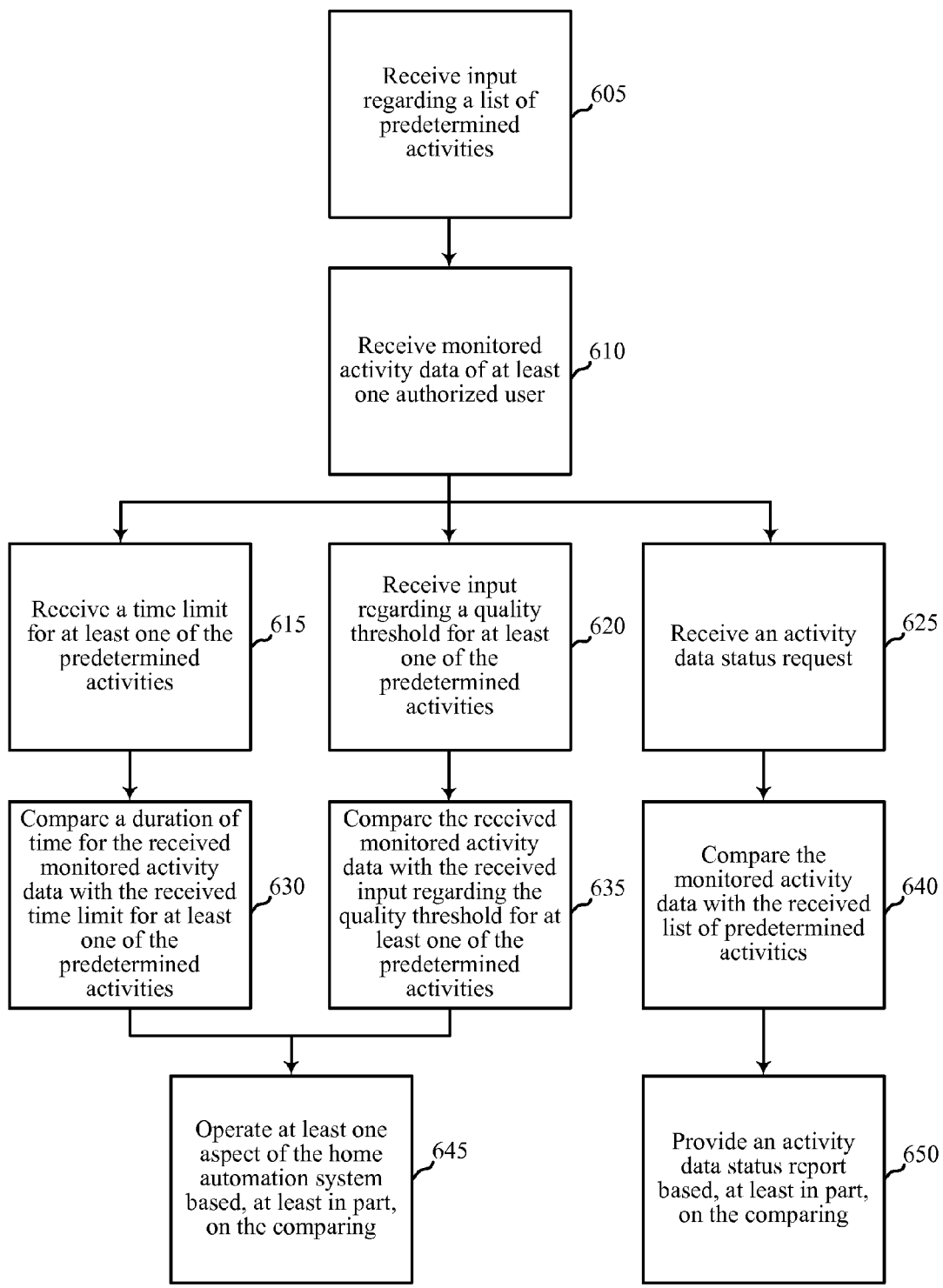
FIG. 6 is a flow chart illustrating an example of a method relating to a home automation system, in accordance with various aspects of this disclosure.

FIG. 6 is a flowchart illustrating an example of a method 600 for receiving input and activity data regarding a list of predetermined activities, and comparing the received input with the received activity data, in accordance with various aspects of the present disclosure. For clarity, the method 600 is described below with reference to aspects of one or more of the sensor units 110, local computing device 115, 120, control panel 135, and/or remote computing device 140 described with reference to FIGS. 1-4, and/or aspects of one or more of the apparatus 205, 205-a, or 205-b described with reference to FIGS. 2-4. In some examples, a control panel, local computing device, and/or sensor unit may execute one or more sets of codes to control the functional elements described below. Additionally or alternatively, the control panel, local computing device, and/or sensor unit may perform one or more of the functions described below using special-purpose hardware.

At block 605, the method 600 may include receiving input regarding a list of predetermined activities. As previously discussed, a user may input preferences relating to a list of predetermined activities at any of a control panel, local computing device, or remote computing device. The received input may relate to any of user identities relating to the list of predetermined activities, types of user activities, quality of user activities to be performed, and duration of time to be spent performing each of the user activities, or a combination thereof.

In some embodiments, the received input regarding the list of predetermined activities may include a prioritization of activities, for example using a point-based system. For example, a parent may indicate that practicing an instrument is worth three points, while doing a chore such as folding laundry, or reading for thirty minutes, are each worth two points. The parent may also input that, when the child has earned ten points through any combination of activities over the course of a week, the child may earn an additional thirty minutes of television, or may earn virtual currency to be exchanged for a toy or other gift, or any other suitable reward.

At block 610, the method 600 may include receiving monitored activity data of at least one authorized user. As previously described, monitored activity data may comprise any of a user identity, user activity type, quality of user activity, or duration of time spent by the user performing the activity, or a combination thereof. The monitored activity data may be received from one or more sensor unit, or may be inputted by a user directly at a control panel, local computing device, or remote computing device. In some embodiments, monitored activity data may be received from a plurality of sources. For example, user heart rate and location may be received from one or more sensor units, while the user identity and type of activity performed may be inputted directly by the user at a control panel. Other variations are also possible.

At block 615, the method 600 may include receiving a time limit for at least one of the predetermined activities. For example, the method 600 may include receiving a minimum time threshold of three hours for practicing violin, or a maximum of two hours for watching television. The time limit input may relate to a single user, or may pertain to a plurality of users and their respective activities.

At block 630, the method 600 may include comparing a duration of time for the received monitored activity data with the received time limit for at least one of the predetermined activities. Thus, as previously described, the method 600 may include comparing activity data indicating an amount of time spent by the user, for example, jumping rope, with the received time limit for a "playing" or "exercising" activity.

At block 645, the method 600 may include operating at least one aspect of the home automation system based, at least in part, on the comparing. For example, if it is determined at block 630 that the user has met the inputted time threshold for the "playing" activity by jumping rope for forty-five minutes, the home automation system may derive an action instruction at block 645 directing the television to unlock such that the user may watch television. Alternatively or in addition, the home automation system may project a congratulatory message to the user, or may display a notification to the parent of the user, indicating that the user has completed the required task and should be rewarded at the parent's discretion.

In addition or as an alternative to receiving a time limit at block 615, at block 620, the method 600 may include receiving input regarding a quality threshold for at least one of the predetermined activities. For example, the method 600 may include receiving a quality threshold with respect to piano practice. In one embodiment, a parent may input a song title that a child is to be practicing, and the home automation system may access an audio recording or written score of the song from, for example, a wireless connection to the Internet. The accessed audio recording or written score may thereby serve as the quality threshold for the piano practice activity, wherein the parent may input preferences relating to percentages of accuracy as compared with the quality threshold.

At block 635, the method 600 may include comparing the received monitored activity data with the received input regarding the quality threshold for at least one of the predetermined activities. Thus, the home automation system may compare the received monitored audio and vibration data, for example, and compare the data to the accessed audio recording or written score of the song being practiced to determine the quality and any improvement in the child's practice.

At block 645, the method 600 may include operating at least one aspect of the home automation system based, at least in part, on the comparing. In one embodiment, the home automation system may determine, based on the comparing at block 635, that the child has improved in the quality of his piano practice, and may accordingly derive an action instruction at block 645 to send a message, for example via an SMS text message, to the child's parent notifying him of the child's improvement, such that the parent may reward the child appropriately. In other embodiments, the home automation system may determine at block 635 that the child has not improved in the quality of his piano practice, and may derive an action instruction at block 645 to lock the television such that the child is not allowed to watch television until he has practiced piano long enough to meet the quality threshold inputted at block 620.

In some embodiments, the comparing steps at blocks 630 and 635 may each contribute to the operation of at least one aspect of the home automation system at block 645. For example, an action instruction may be derived at block 645 on the basis of both the duration and the quality of the activity meeting inputted thresholds. In one embodiment, the home automation system may receive activity data indicating that the child has read for a required hour, and has also read at the threshold rate of forty pages per hour, and may accordingly derive an action instruction indicating that the child has earned an additional thirty minutes of videogame playing time by meeting these thresholds. Accordingly, at block 645, the home automation system may communicate the action instruction to the television and videogame systems to allow the child access for an additional thirty minutes.

At block 625, the method 600 may include receiving an activity data status request. This request may be received at a control panel, or may be received at a local computing device such as in a dedicated application on a smartphone, or the like. The activity data status request may, for example, be received at the control panel in the form of an auditory command. In other embodiments, the activity data status request may be received as input at a screen or keypad. The activity data status request may pertain to a single user or to a plurality of users, and may similarly pertain to a single activity or to a plurality of activities.

At block 640, the method 600 may include comparing the monitored activity data with the received list of predetermined activities. The monitored activity data may relate to a single activity for a single user, multiple activities for a single user, a single activity for multiple users, or multiple activities for multiple users. The received list of predetermined activities may, as previously discussed, comprise time limit and/or quality thresholds, or may relate only to the type of activity and/or the user performing the activity. Accordingly, the comparison at block 640 may be performed with regard to a plurality of activity data and corresponding thresholds.

At block 650, the method 600 may include providing an activity data status report based, at least in part, on the comparing. As previously discussed, the activity data status report may relate to a single or multiple users, and may provide information relating to a single or multiple activities. The activity data status report may be provided in any acceptable form. For example, the activity data status report may be provided in the form of an auditory report broadcasted from a speaker system at a control panel. Alternatively or in addition, the report may be displayed on a screen at a control panel, local computing device, or remote computing device. In one embodiment, the report may be projected onto a wall, ceiling, floor, or other surface adjacent to a control panel. In still other embodiments, the report may be printed from a printer linked via a wired or wireless communication link with the home automation system. The delivered activity data status report may indicate any information relating to activity data as compared to inputted thresholds, and any resulting operations of various aspects of the home automation system resulting from these comparisons. For example, the report may indicate that a child has earned seven points toward the ten points needed to earn additional television time, and may indicate those activities available to the child to reach the ten point goal. In other embodiments, the report may contain information detailing the child's progress in improving his piano skills or reading speed, or the like.

Thus, the method 600 may provide for activity monitoring by a home automation system. It should be noted that the method 600 is just one implementation and that the operations of the method 600 may be rearranged or otherwise modified such that other implementations are possible.

In some examples, aspects from two or more of the methods 500, 600 may be combined and/or separated. It should be noted that the methods 500, 600 are just example implementations, and that the operations of the methods 500-600 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for a home automation system, comprising:
receiving input, by the home automation system, regarding a list of predetermined activities;
receiving monitored activity data, by the home automation system, of at least one authorized user;
comparing the received monitored activity data with the received input regarding the list of predetermined activities; and
initiating an action, by the home automation system, the initiation based at least in part on the comparing, and the action associated with a motivator for the at least one authorized user to reach a goal relating to at least one non-virtual activity, wherein the action is initiated prior to reaching the goal and prior to the at least one authorized user attempting to access a reward associated with and distinct from the goal, and wherein the action comprises communicating a message including at least one step for reaching the goal, and wherein the content of the message comprises an indication of the reward.

2. The method of claim 1, wherein receiving the input comprises receiving a time limit for at least one of the predetermined activities, and
wherein comparing the received monitored activity data with the received input regarding the list of predetermined activities comprises comparing a duration of time for the received monitored activity data with the received time limit for at least one of the predetermined activities.

3. The method of claim 1, wherein receiving the input comprises receiving input regarding a quality threshold for at least one of the predetermined activities, and
wherein comparing the received monitored activity data with the received input regarding the list of predetermined activities comprises comparing the received monitored activity data with the received input regarding the quality threshold for at least one of the predetermined activities.

4. The method of claim 1, wherein the monitored activity data comprises monitored activity data of the at least one authorized user, and wherein receiving the monitored activity data further comprises receiving an activity data status request, and
wherein comparing the received monitored activity data with the received input regarding the list of predetermined activities comprises comparing the monitored activity data of the at least one authorized user with the received input regarding the list of predetermined activities; and
the method further comprising providing an activity data status report based at least in part on the comparing.

5. The method of claim 1, further comprising:
providing an alert prior to operating the at least one aspect of the home automation system.

6. The method of claim 1, wherein the monitored activity data is at least one of reading, or practicing an instrument, or exercising, or playing, or watching television, or playing videogames, or doing chores, or a combination thereof.

7. The method of claim 1, wherein the at least one aspect of the home automation system is at least one of turning on or off an appliance, or generating a message or alert, or awarding virtual currency or points, or communicating activity data to the authorized user, or communicating activity data to a second user, or a combination thereof.

8. The method of claim 1, wherein the received monitored activity data is received via at least one of a vibration sensor, or a video monitor, or an audio monitor, or a wireless signal detector, or a heart rate detector, or a breathing detector, or a heat sensor, or a motion detector, or a location position sensor, or a global position sensor, or a facial recognition detector, or a combination thereof.

9. The method of claim 8, further comprising:
detecting at least one pattern of activity data; and
adaptively learning an identity of activity data based, at least in part, on the detected at least one pattern.

10. The method of claim 1, wherein the monitored activity data is received from a mobile monitoring device, the mobile monitoring device comprising a wearable sensor.

11. An apparatus for a home automation system, comprising:
a processor;
memory in electronic communication with the processor; and
instructions stored in the memory, the instructions being executable by the processor to cause the home automation system to:
receive input regarding a list of predetermined activities;
receive monitored activity data of at least one authorized user;
compare the received monitored activity data with the received input regarding the list of predetermined activities; and
initiate an action based at least in part on the comparing, and the action associated with a motivator for the at least one authorized user to reach a goal relating to at least one non-virtual activity, wherein the action is initiated prior to reaching the goal and prior to the at least one authorized user attempting to access a reward associated with and distinct from the goal, and wherein the action comprises communicating a message including at least one step for reaching the goal, and wherein the content of the message comprises an indication of the reward.

12. The apparatus of claim 11, further comprising:
a receiver to receive a time limit for at least one of the predetermined activities, wherein the processor is further operable to:
compare a duration of time for the received monitored activity data to the received time limit for at least one of the predetermined activities; and
initiate the action related to the home automation system, the initiation based at least in part on the comparing the duration of time for the received monitored activity data to the received time limit.

13. The apparatus of claim 11, further comprising:
a receiver to receive input regarding a quality threshold of at least one predetermined activity, wherein the processor is further operable to:
compare the received monitored activity data with the received input regarding the quality threshold of the at least one predetermined activity; and
initiate the action related to the home automation system, the initiation based at least in part on the comparing the received monitored activity data with the received input regarding the quality threshold.

14. The apparatus of claim 11, further comprising:
a receiver to receive an activity data status request, wherein the processor is further operable to:
compare the monitored activity data of the at least one authorized user with the received input regarding the list of predetermined activities; and
provide an activity data status report based at least in part on the comparing.

15. The apparatus of claim 11, wherein the monitored activity data is at least one of reading, or practicing an instrument, or exercising, or playing, or watching television, or playing videogames, or doing chores, or a combination thereof.

16. The apparatus of claim 11, wherein the at least one aspect of the home automation system is at least one of turning on or off an appliance, or generating a message or alert, or awarding virtual currency or points, or communicating activity data to the authorized user, or communicating activity data to a second user, or a combination thereof.

17. The apparatus of claim 11, wherein the received monitored activity data is received via at least one of a vibration sensor, or a video monitor, or an audio monitor, or a wireless signal detector, or a heart rate detector, or a breathing detector, or a heat sensor, or a motion detector, or a location position sensor, or a global position sensor, or a facial recognition detector, or a combination thereof.

18. The apparatus of claim 11, wherein the processor is further configured to:
   detect at least one pattern of activity data; and
   adaptively learn an identity of activity data based, at least in part, on the detected at least one pattern.

19. The apparatus of claim 11, wherein the monitored activity data is received from a mobile monitoring device, the mobile monitoring device comprising a wearable sensor.

20. A non-transitory computer-readable medium storing computer-executable code, the code executable by a processor to cause the home automation system to:
   receive input regarding a list of predetermined activities;
   receive monitored activity data of at least one authorized user;
   compare the received monitored activity data with the received list of predetermined activities; and
   initiate an action based at least in part on the comparing, and the action associated with a motivator for the at least one authorized user to reach a goal relating to at least one non-virtual activity, wherein the action is initiated prior to reaching the goal and prior to the at least one authorized user attempting to access a reward associated with and distinct from the goal, and wherein the action comprises communicating a message including at least one step for reaching the goal, and wherein the content of the message comprises an indication of the reward.

* * * * *